United States Patent
Bujak et al.

(10) Patent No.: US 10,118,476 B2
(45) Date of Patent: Nov. 6, 2018

(54) ENGINE MOUNT ASSEMBLY FOR A VEHICLE DRIVE UNIT

(71) Applicant: AUDI AG, Ingolstadt (DE)

(72) Inventors: Marek Bujak, Wellheim (DE); Andreas Fischer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/371,981

(22) Filed: Dec. 7, 2016

(65) Prior Publication Data

US 2017/0174065 A1 Jun. 22, 2017

(30) Foreign Application Priority Data

Dec. 17, 2015 (DE) .................. 10 2015 016 390

(51) Int. Cl.
*B60K 5/12* (2006.01)
*B62D 21/11* (2006.01)

(52) U.S. Cl.
CPC .......... *B60K 5/1241* (2013.01); *B60K 5/1208* (2013.01); *B60K 5/1216* (2013.01); *B62D 21/11* (2013.01); *B60Y 2304/03* (2013.01)

(58) Field of Classification Search
USPC ........................................ 248/674, 675, 200
See application file for complete search history.

(56) References Cited

U.S. PATENT DOCUMENTS

| 6,182,692 | B1 | 2/2001 | Fischer et al. | |
| 6,223,850 | B1 * | 5/2001 | Rajca | B60K 5/12 180/312 |
| 6,708,793 | B2 | 3/2004 | Withersppoon et al. | |
| 6,923,418 | B2 * | 8/2005 | Hotta | F02F 7/0073 123/198 R |
| 8,042,793 | B2 * | 10/2011 | Igami | B60K 5/1216 180/297 |
| 9,428,040 | B2 * | 8/2016 | Shibata | B60K 1/00 |
| 9,630,484 | B1 * | 4/2017 | Valdez | B60K 5/12 |
| 2016/0059685 | A1 | 3/2016 | Bujak et al. | |

(Continued)

FOREIGN PATENT DOCUMENTS

| DE | 10 2005 039 312 | 1/2007 |
| DE | 102006041094 | 3/2008 |
| DE | 10 2012 012 327 | 12/2013 |

(Continued)

OTHER PUBLICATIONS

European Search Report dated Mar. 14, 2017 by the European Patent Office in European Application EP 16 20 0255.

(Continued)

*Primary Examiner* — Alfred J Wujciak
(74) *Attorney, Agent, or Firm* — Henry M. Feiereisen LLC

(57) ABSTRACT

An engine mount for a drive unit in a vehicle includes a bracket having first and second joining points for attachment of the bracket to the drive unit. A first mounting member connects the bracket to the drive unit in the first joining point along a first joining axis. An engine mount is arranged on a vehicle body and supports the drive unit via the bracket. A second mounting member connects the bracket to the drive unit in the second joining point along a second joining axis. The first and second joining axes extend at a slant to each other by an axis angle.

13 Claims, 3 Drawing Sheets

(56) References Cited

U.S. PATENT DOCUMENTS

2016/0263982 A1* 9/2016 Miya ................. B60K 5/1216
2017/0100997 A1* 4/2017 Hill ....................... B60K 5/10

FOREIGN PATENT DOCUMENTS

DE   10 2013 007 460      10/2014
EP         1 361 099 A2    11/2003
FR         2 980 742 A3     4/2013

OTHER PUBLICATIONS

English translation of European Search Report dated Mar. 14, 2017 by the European Patent Office in European Application EP 16 20 0255.

* cited by examiner

ENGINE MOUNT ASSEMBLY FOR A VEHICLE DRIVE UNIT

CROSS-REFERENCES TO RELATED APPLICATIONS

This application claims the priority of German Patent Application, Serial No. 10 2015 016 390.6, filed Dec. 17, 2015, pursuant to 35 U.S.C. 119(a)-(d), the disclosure of which is incorporated herein by reference in its entirety as if fully set forth herein.

BACKGROUND OF THE INVENTION

The present invention relates to an engine mount assembly for a drive unit in a vehicle.

The following discussion of related art is provided to assist the reader in understanding the advantages of the invention, and is not to be construed as an admission that this related art is prior art to this invention.

A vehicle has a drive unit, e.g. an internal combustion engine with transmission or an electric machine, which is normally arranged in the engine compartment of a vehicle forward structure and mounted to a load-bearing structure of the vehicle body via vibration-damping engine mounts. The connection between the drive unit and the load-bearing structure is realized via brackets, i.e. engine brackets and/or transmission brackets, which are supported via the engine mounts upon the load-bearing structure of the vehicle body. For example, the drive unit can be supported via a three-point or four-point mount via leading and trailing engine mounts on a subframe in the forward structure of the vehicle.

It would be desirable and advantageous to provide an improved engine mount which obviates prior art shortcomings and which realizes a vibration-free attachment of the drive unit.

SUMMARY OF THE INVENTION

According to one aspect of the present invention, an engine mount for a drive unit in a vehicle includes a bracket having first and second joining points for attachment of the bracket to the drive unit, a first mounting member connecting the bracket to the drive unit in the first joining point along a first joining axis, and engine mount arranged on a vehicle body and supporting the drive unit via the bracket, and a second mounting member connecting the bracket to the drive unit in the second joining point along a second joining axis, the first and second joining axes extending at a slant to each other by an axis angle.

The present invention thus resolves prior art problems by providing between the bracket and the drive unit at least two joining points which are oriented in different spatial directions. In other words, not all screw axes extend in axis-parallel relationship between the bracket and the drive unit.

According to another advantageous feature of the present invention, each of the first and second joining points can be a screw-connection point. For example, screw bolts used at the screw-connection points are thus arranged along first and second screw axes which are oriented in spatially different directions in relation to one another. The first and second screw axes of the inserted screw bolts thus extend at a slant to each other by an axis angle. Advantageously, the first and second joining axes, e.g. screw axes, can extend at a right angle relative to each other.

The provision of a screw connection between the bracket and the drive unit is described here for ease of understanding and represents only a currently preferred way to realize the connection of the bracket with the drive unit. It will be understood by a person skilled in the art that the present invention should not be limited to this particular type of securement but rather that any other type of securement can be included without departing from the scope of the present invention.

According to another advantageous feature of the present invention, the first joining axis can extend in alignment with a vehicle longitudinal direction, and the second joining axis can extend in alignment with a vehicle transverse direction.

According to another advantageous feature of the present invention, third and fourth mounting members can be provided to connect the bracket to the drive unit in corresponding third and fourth joining points, with one of the third and fourth mounting members being aligned along the first joining axis and another one of the third and fourth mounting members being aligned along the second joining axis. In other words, the screw bolts in two of the screw-connection points extend along first screw axes and the screw bolts in two other ones of the screw-connection points extend along second screw axes. As a result, a particularly torsion-resistance attachment in two joining points can be realized.

According to another advantageous feature of the present invention, the bracket can contact at each of the first and second joining points the drive unit via planar surfaces which extend in an attachment plane arranged orthogonally to the first and second mounting members of the first and second joining points, respectively. This also promotes a torsion-resistant attachment. Advantageously, the attachment plane of the first joining point and the attachment plane of the second joining point extend relative to one another at a slant, e.g. at a right angle.

According to another advantageous feature of the present invention, the bracket can include a first support arm connected to the drive unit via the first joining point, and a second support arm connected to the drive unit via the second joining point. The first and second support arms can hereby converge in one piece and at same material at a mount-side, pedestal-shaped screw-on base which can be attached to the body-side engine mount of the vehicle body. The engine mount may have a body-side mounting eye for arrangement of a mount core with interposed elastomer body, with the mount core being bolted together with the bracket.

The upper first support arm of the bracket can be bolted via the first joining point to the drive unit, whereas the second support arm can be bolted via the second joining point to the drive unit.

According to another advantageous feature of the present invention, the first and second support arms of the bracket can span an inner corner region which borders an outer corner of the drive unit, when assembled.

As described above, the screw-on base of the bracket is in screw connection with the body-side engine mount. The screw-on base of the bracket can hereby be bolted by a screw bolt along a screw axis with the engine mount, e.g. the mount core thereof. In order to realize a torsion-resistant union between the drive unit and the vehicle body, the screw axis between the screw-on base of the bracket and the engine mount can be oriented in alignment with one of the first and second joining axes between the drive unit and the bracket.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
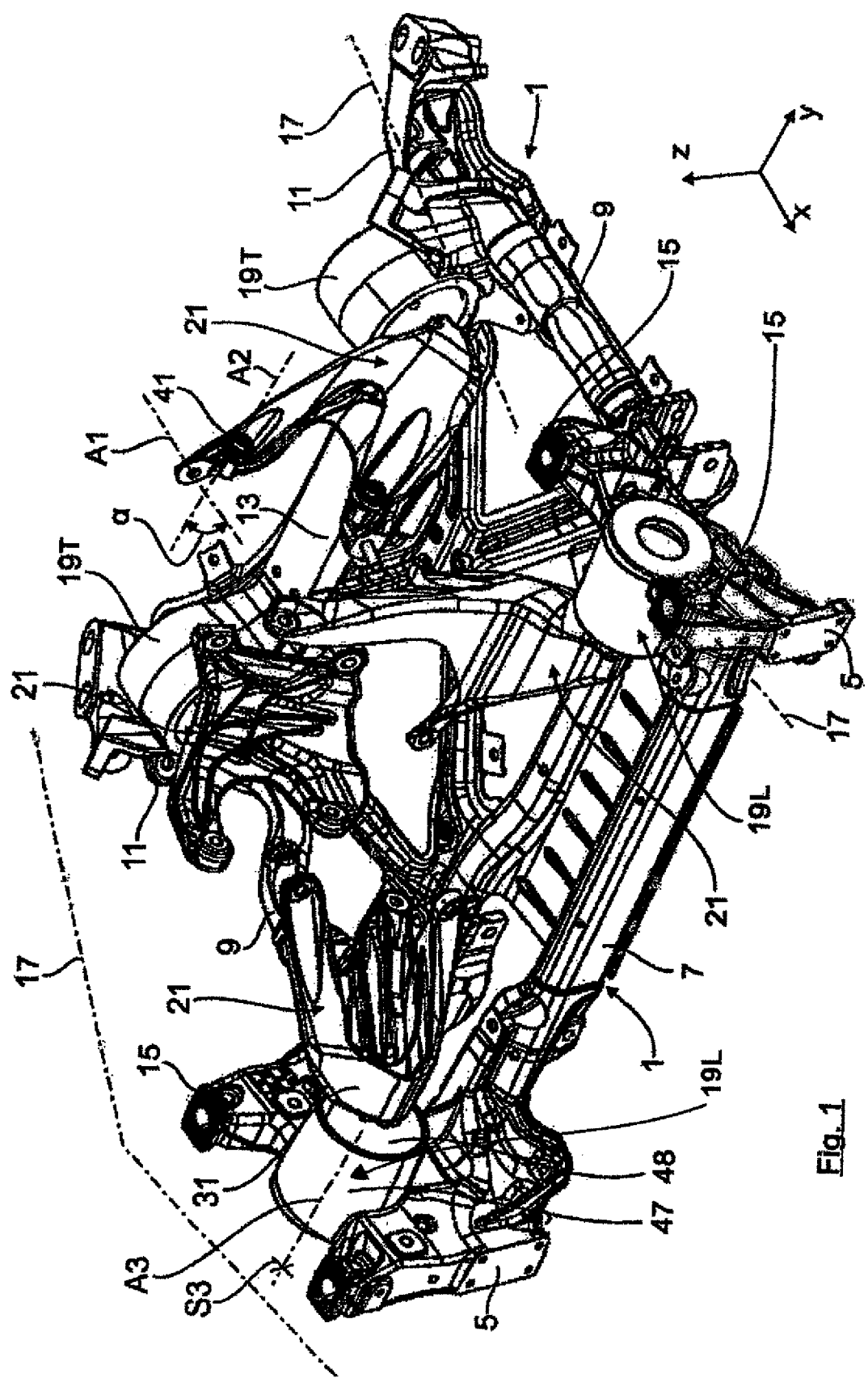
FIG. 1 is a perspective illustration of a subframe for a forward structure region of a motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
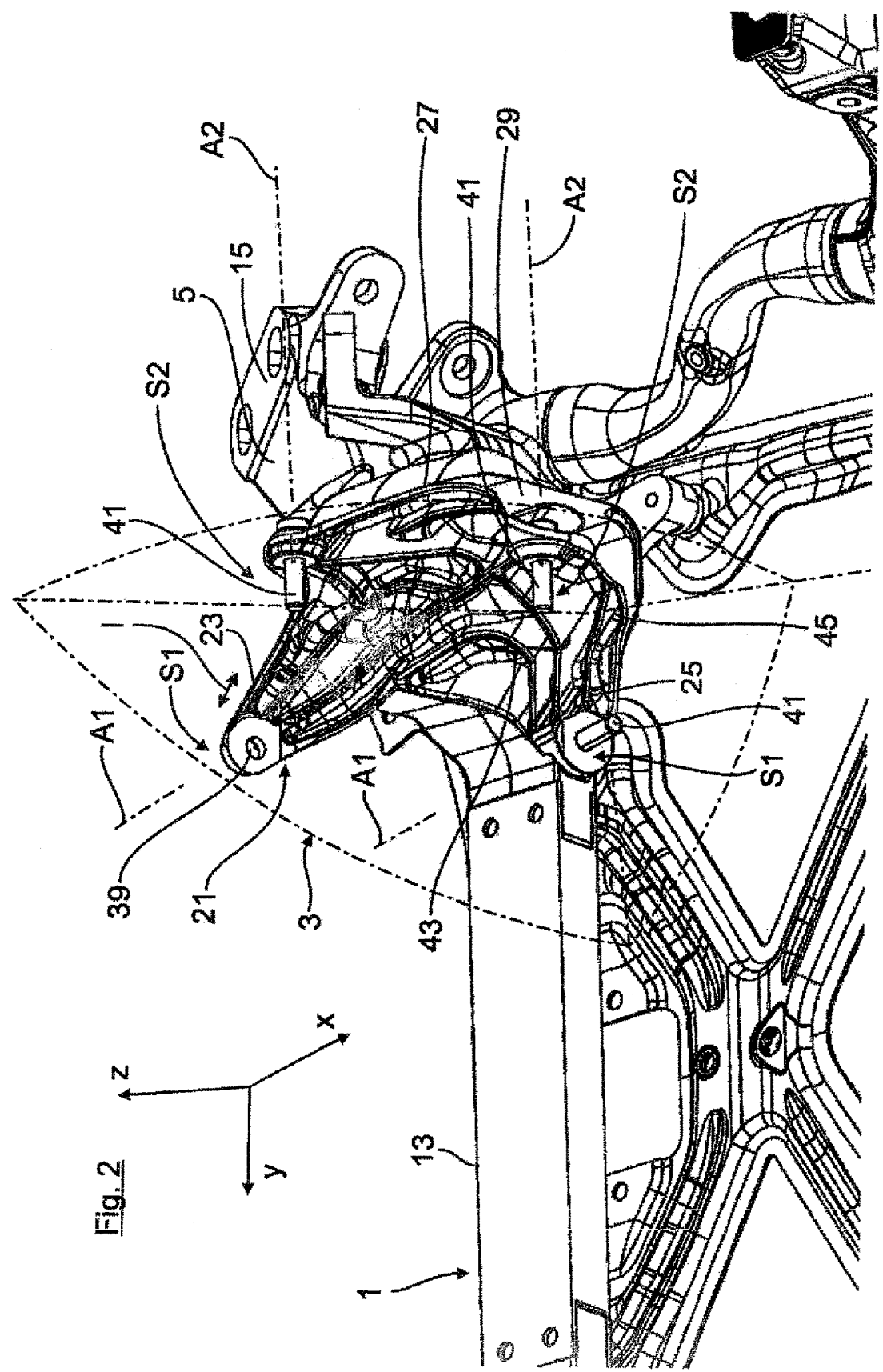
FIG. 2 is a perspective illustration, on an enlarged scale, of part of a bracket for torsion-resistant attachment of a drive unit to the subframe.
Figure 3:
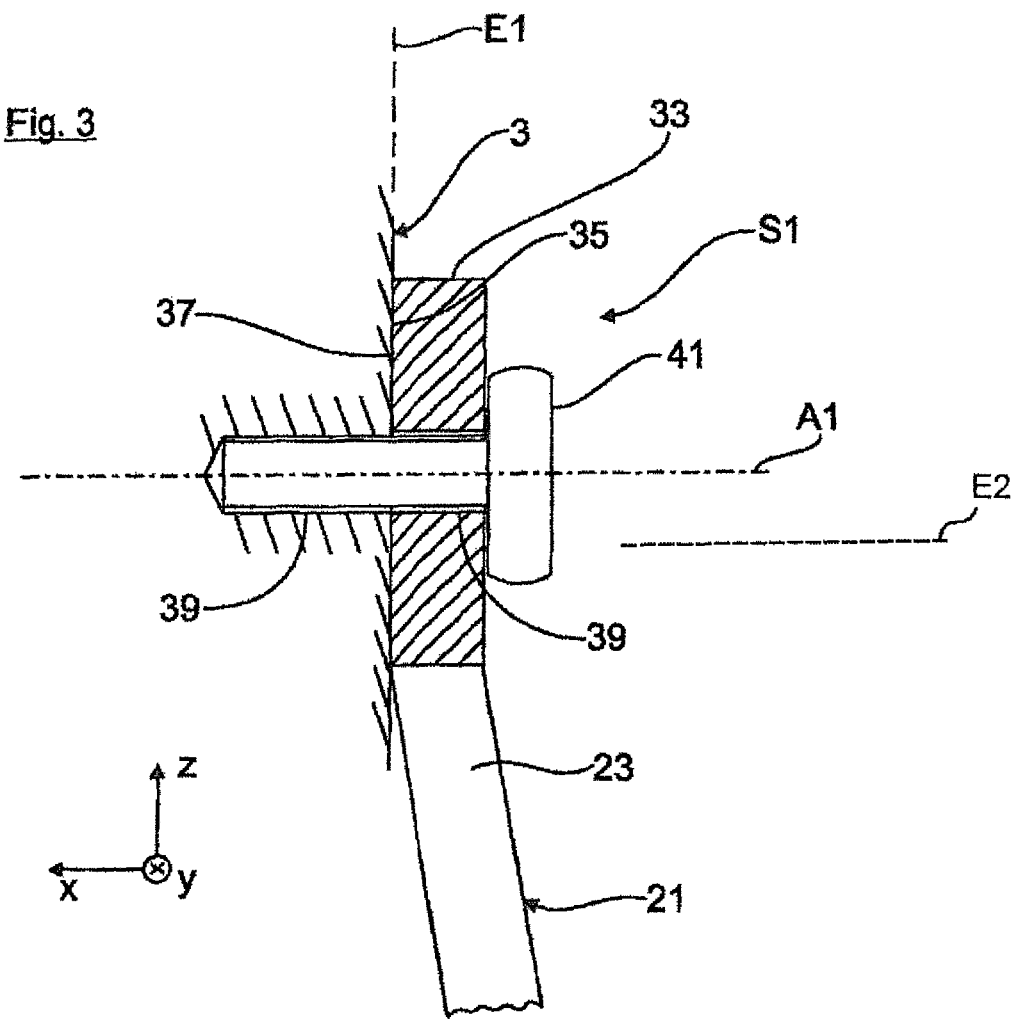
FIG. 3 is a sectional view of a screw-connection point between the drive unit and a support arm of the bracket.

Turning now to the drawing, and in particular to FIG. 1, there is shown a perspective illustration of a subframe, generally designated by reference numeral 1, for a forward structure region of a motor vehicle (not shown) to support a drive unit 3, indicated schematically in FIGS. 2 and 3. The subframe 1 has two leading lateral cast nodes 5 which are connected to one another by a leading crossbeam 7 of the subframe 1. The leading cast nodes 5 are extended to the rear in vehicle longitudinal direction x by lateral longitudinal beams 9 of the subframe 1, with the longitudinal beams 9 being connected at trailing cast nodes 11 to a trailing crossbeam 13 of the subframe 1. The leading cast nodes 5 of the subframe 1 are secured at screw points 15 to side rails 17, indicated by dash-dot line only, of the vehicle body. As is readily apparent from FIG. 1, provision is made for an engine mount at each of the leading and trailing cast nodes 5, 11. The engine mounts are bolted to brackets 21, respectively, so that the drive unit 3, e.g. an electric machine, is supported on the subframe 1 by way of a four-point mounting. The engine mounts consist of two leading engine mounts 19L, 19L and two trailing engine mounts 19T, 19T spaced from the two leading engine mounts 19L, 19L in a longitudinal direction x of the vehicle. The two leading engine mounts 19L, 19L are spaced from each other in a vehicle transverse direction y and have screw axes extending in the vehicle transverse direction y. The two trailing engine mounts 19T,19T are spaced from each other in the vehicle transverse direction y and have screw axes extending in the vehicle longitudinal direction x.

The geometry of one of the brackets 21 will now be described with reference to FIGS. 1 to 3. The bracket 21, shown in FIG. 2, has four support arms 23, 25, 27, 29, which are made in one piece and of same material as a pedestal-shaped screw-on base 31 (FIG. 1) where the support arms 23, 25, 27, 29 converge to. The screw-on base 31 of the bracket 21 is joined to the corresponding engine mount 19 by a screw connection S3, as shown in FIG. 1.

As is readily apparent from FIG. 2, the support arms 23, 25, 27, 29 project out from the screw-on base 31 by a lever arm length l and have each a free end formed with a flange 33 (FIGS. 1 and 3). The support arms 23, 25, 27, 29 are bolted together with the drive unit 3 via two screw-connection points S1 and two screw-connection points S2. The screw-connection points S1 and S2 are oriented in different spatial directions, as will be described hereinafter.

FIG. 3 depicts the screw connection point S1 between the drive unit 3 and the support arm 23 of the bracket 21 by way of an enlarged cutaway sectional view. Accordingly, the flange 33 of the support arm 23 and an attachment contour of the drive unit 3 are in contact with each other at the screw-connection point S1 via planar surfaces 35, 37. The planar surfaces 35, 37 extend in FIG. 3 in an attachment plane E1. In addition, the two planar surfaces 35, 37 are traversed by screw holes 39 for passage of a screw bolt 41 by which the bracket 21 is bolted together with the drive unit 3 along a screw axis A1. The screw axis A1 of the screw-connection point S1 is oriented in FIGS. 2 and 3 in alignment with the vehicle longitudinal axis x.

As shown in FIG. 2, the support arms 23, 25, 27, 29 of the bracket 23 span an inner corner region 43, indicated by a curly bracket, which borders a corresponding outer corner 45 of the drive unit 3, indicated by dash-dot line in FIG. 2. For this purpose, the screw bolts 41 of the support arms 23, 35 are bolted in FIG. 2 to the drive unit 3 along the first screw axes A1 in the vehicle longitudinal direction x, thereby forming the first screw-connection points S1. Conversely, the support arms 27, 29 are bolted at the second screw-connection points S2 to the drive unit 3 by two screw bolts 41 which are oriented along two screw axes A2 which are in alignment with the vehicle transverse direction y.

The first and second screw axes A1, A2 are thus oriented in orthogonal relationship. Likewise, also the attachment planes E1, E2 of the differently oriented screw-connection points S1, S2 are oriented at a right angle to one another, as indicated in FIG. 3.

In view of this particular attachment geometry of the support arms, 23, 25, 27, 29 of the corresponding bracket 21 upon the drive unit 3, a particularly torsion-resistant union between the drive unit 3 and the corresponding bracket 21 is realized, so that the bracket 21, unlike conventional brackets, requires less material, without adversely affecting vibration stiffness thereof.

In FIGS. 1 to 3, the engine mounts are configured, by way of example, in the form of radially outer mounting eyes 47 which are formed on the cast nodes 5, 11, respectively. Arranged radially inwards of the mounting eyes 47 is a mount core 48 with interposed elastomer body. The mount core 48 is bolted at the screw-connection point S3 with the screw-on base 31 of the bracket 21 by a not shown screw bolt along the screw axis A3 (FIG. 1). To further enhance vibration stiffness, the screw axis S3 between the screw-on base 31 and the correspondingly leading engine mount 19L, 19L is oriented in alignment with the vehicle transverse direction y. In contrast thereto, the two trailing engine mounts 19T, 19T are oriented with their screw axes A3 in alignment with the vehicle longitudinal direction y.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. An engine mount assembly for a drive unit in a vehicle, comprising:
   brackets having first and second joining points for attachment to the drive unit;
   first mounting members connecting the brackets to the drive unit in the first joining points along a first joining axis;
   engine mounts arranged on a vehicle body and supporting the drive unit via the brackets; and
   second mounting members connecting the bracket to the drive unit in the second joining points along a second joining axis, said first and second joining axes extending at a slant to intersect each other by an axis angle,
   said engine mounts having cylindrical body-side mounting eyes and cylindrical mount cores arranged inside of said mounting eyes, wherein each cylindrical mount core is hollow for engine to be stored therein, said engine mounts including two leading engine mounts and two trailing engine mounts spaced from the two leading engine mounts in a vehicle longitudinal direction of the vehicle, said two leading engine mounts being spaced from each other in a vehicle transverse direction and have screw axes extending in the vehicle transverse direction, and said two trailing engine mounts being spaced from each other in the vehicle transverse direction and have screw axes extending in the vehicle longitudinal direction.

2. The engine mount assembly of claim 1, wherein each of the first and second joining points is a screw-connection point.

3. The engine mount assembly of claim 1, wherein the first and second joining axes extend at a right angle relative to each other.

4. The engine mount assembly of claim 1, wherein the first joining axis extends in alignment with the vehicle longitudinal direction, and the second joining axis extends in alignment with the vehicle transverse direction extending transversely to the vehicle longitudinal direction.

5. The engine mount assembly of claim 1, further comprising third and fourth mounting members connecting the bracket to the drive unit in corresponding third and fourth joining points, with one of the third and fourth mounting members being aligned along the first joining axis and another one of the third and fourth mounting members being aligned along the second joining axis.

6. The engine mount assembly of claim 1, wherein the bracket contacts the drive unit at each of the first and second joining points via planar surfaces which extend in a plane arranged orthogonally to the first and second mounting members of the first and second joining points, respectively.

7. The engine mount assembly of claim 6, wherein the plane of the first joining point and the plane of the second joining point extend at a slant relative to one another.

8. The engine mount assembly of claim 6, wherein the plane of the first joining point and the plane of the second joining point extend at a right angle relative to one another.

9. The engine mount assembly of claim 1, wherein the bracket includes a first support arm connected to the drive unit via the first joining point, and a second support arm connected to the drive unit via the second joining point, said first and second support arms configured to converge at a mount-side screw-on base which is bolted to the mount.

10. The engine mount assembly of claim 9, wherein the first and second support arms define an inner corner region which borders an outer corner of the drive unit.

11. The engine mount assembly of claim 1, wherein the bracket is bolted to the engine mount via a screw connection using a screw bolt extending along a screw axis.

12. The engine mount assembly of claim 11, wherein the screw axis extends in alignment with one of the first and second joining axes.

13. The engine mount assembly of claim 1, wherein each of the engine mounts has the body-side mounting eye for arrangement of the mount core with interposed elastomer body, said mount core being bolted to the bracket.

* * * * *